United States Patent Office 2,856,364
Patented Oct. 14, 1958

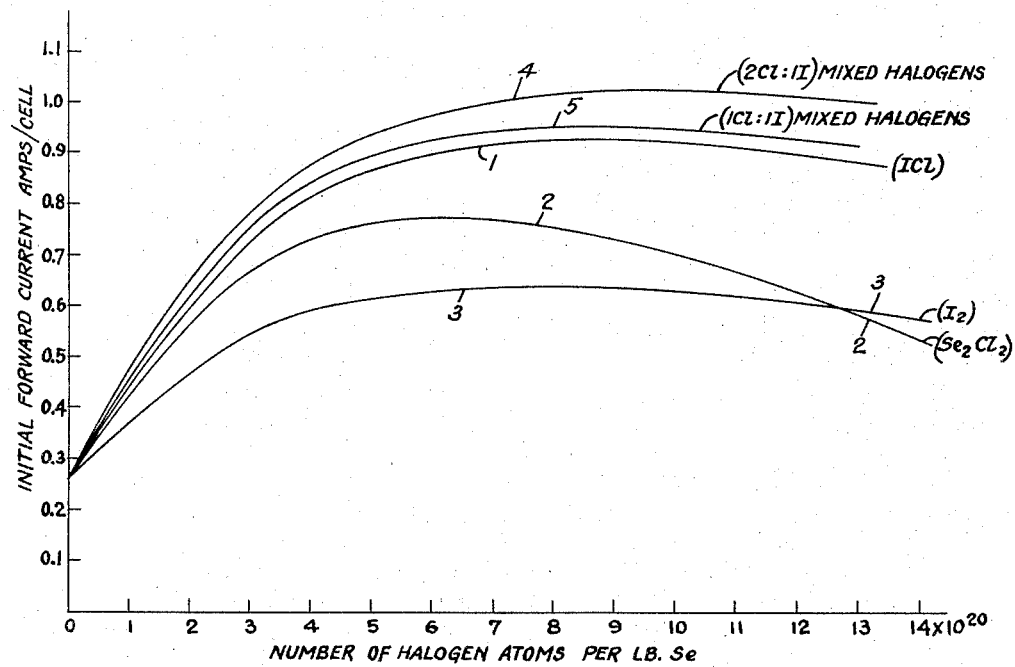

2,856,364

SELENIUM RECTIFIERS

William Lewanda, Fairlawn, N. J., Frank Marasa, Long Island City, N. Y., and Robert F. Durst, Orange, N. J., assignors to International Telephone and Telegraph Corporation, New York, N. Y., a corporation of Maryland Application May 31, 1955, Serial No. 511,912

4 Claims. (Cl. 252—62.3)

This invention relates to selenium rectifiers and particularly to the treatment of the selenium for such rectifiers.

More particularly, this invention relates to the treatment of selenium by adding two elements from the halogen group.

Since the advent of the selenium rectifier and the realization of the many advantages which can be derived therefrom, the industry has been making considerable effort to "improve" the selenium used as the principal layer in selenium rectifiers. By "improving," it is meant to obtain rectifier having better forward-conductivity, faster forming time, fewer defects during forming and longer life. It has been found that the selenium may be improved by adding a halogen to the selenium in the form of a selenide, or compound of two different halogens (halogen-halides) such as iodine-monochloride.

Although the addition of a halogen has improved the selenium to some extent further effort has been made to reduce the number of rectifier rejects due to low-forward conductivity (low-forward rejects). Using the conventional processes, low-forward rejects often are as high as 20%.

Accordingly, an object of this invention is to provide improved selenium so treated with halogens that rectifiers using such selenium suffer low-forward rejects of less than 1%.

It is a further object of this invention to provide such selenium for selenium rectifiers which results in the rectifiers having improved characteristics.

In accordance with a feature of the invention, there is added to the selenium, two elements of the halogen group, the two elements being added in an uncombined state with respect to each other and in a single step.

In accordance with an aspect of the invention, there is provided a process for the treatment of selenium used in rectifier elements characterized by adding to the selenium, chlorine or chloride, and iodine or iodide; the two elements being added to the selenium as separate halogens or halogen compounds, or combinations thereof, but not as halogen-halides.

The above-mentioned and other features and objects of this invention and the manner of attaining them will become more apparent by reference to the following description of an embodiment of the invention taken in conjunction with the accompanying drawing, showing the improved characteristics obtained by following the principles of the present invention as opposed to the results obtained using prior art processes.

It is known from U. S. Patent 2,450,886 granted October 12, 1948, to add the compound iodine-monochloride (ICl) to selenium (Se). Referring to Fig. 1, a plot of the initial forward-current in amperes per rectifier cell at 1.3 volts alternating-current, vs. the number of halogen atoms in one gram of selenium is shown for different atomic ratios of mixed halogens as indicated, including a plot of the prior art compound ICl indicated at 1. Although the addition of the compound ICl produces an improvement over $Se_2Cl_2$ alone, as shown by curve 2, or iodine alone, as shown by curve 3, still a large number low-forward rejects occurred.

In accordance with the present invention, an improved selenium rectifier was produced by adding to the selenium, chlorine or chloride, and iodine or iodide.

Thus, the invention is characterized by adding chlorine and iodine as separate halogens to the selenium. The halogens may be either in elemental form or halide form.

In a first example, 2.77 grams of $Se_2Cl_2$ was added to 10 kg. of Se to form one batch and 3.839 grams of $I_2$ was added to 10 kg. of Se to form a second batch. The two batches were mixed in several tests so that the approximate atomic ratios of $Cl_2$ to $I_2$ were 1:1, 2:1 and 3:1. Extremely favorable results were obtained, particularly for the ratio of 2:1. The curve for the preferred ratio is shown at 4 in the figure. In this process, each batch was heated independently of the other during the addition of the halogen to the particular batch and then the batches were reheated when the two were mixed together.

In a preferred example, the above process was simplified by adding $Se_2Cl_2$ and $I_2$ to the same batch of Se pellets in such proportions as to yield a composition containing approximately 1.85 grams of selenium monochloride and 1.28 grams of iodine per 10 kg. of selenium. A measured amount of $Se_2Cl_2$ was first poured into the Se, and then a weighed amount of $I_2$ was added to the Se in accordance with the ratios specified in the first example. This process was preferred over the process of Example 1, in that it was simpler because the Se was heated to the desired temperature only once instead of twice. By heating the batch once instead of twice, a lesser amount of chlorine was lost.

Referring to the graph it is seen that although the curve for the compound ICl in Se appears close to the curve 5 obtained by mixing separately the halogens I and Cl in the atomic ratio of 1:1, there is nevertheless a definite improvement. In addition to the improved forward-conductivity, the forming time was better and the number of failures during forming was less. Further, in the region where the percentage of the compound of ICl yielded best forward-conductivity, failures as high as 50% occurred because the halogen content was excessive. Therefore, a reduction in the halogen content was required which consequently reduced the forward-conductivity to far less than optimum; thus reducing greatly the practical value of the compound ICl.

While I have described above the principles of my invention in connection with specific embodiments, it is to be clearly understood that this description is made only by way of example and not as a limitation of the scope of my invention as set forth in the objects thereof and in the accompanying claims.

What is claimed is:

1. A process of treating selenium for use in selenium rectifiers, characterized by adding to the selenium, a chlorine salt of selenium and iodine uncombined with each other, in the atomic ratio of chlorine to iodine of from 1:1 to 3:1

2. The process according to claim 1 wherein said chlorine is added in the form of selenium-monochloride and said iodine is added in the form of elemental iodine.

3. The process according to claim 1 wherein the atomic ratio of chlorine to iodine is approximately 2:1.

4. A process of treating selenium for use in selenium rectifiers characterized by heating selenium to a melting temperature adding selenium-monochloride and elemental iodine to form a single batch, the selenium-monochloride and iodine being added in such proportions as to yield a composition containing approximately 1.85 grams of selenium monochloride per 10 kg. of selenium and 1.28 grams of iodine per 10 kg. of selenium.

References Cited in the file of this patent

UNITED STATES PATENTS 2,450,886    Escoffery et al.    Oct. 12, 1948

OTHER REFERENCES

Mellor: Comprehensive Treatise on Inorganic and Theoretical Chemistry, 1922, vol. 2, pages 117, 118.